(12) United States Patent
Griseri et al.

(10) Patent No.: US 8,477,411 B2
(45) Date of Patent: Jul. 2, 2013

(54) FIBER-ADAPTIVE DISTRIBUTED RAMAN AMPLIFIER PUMP SETUP SCHEME

(75) Inventors: Enrico Griseri, Milan (IT); Giovanni Osnago, Rovagnate (IT); Mauro Brunella, Brugherio (IT)

(73) Assignee: Cisco Technology, Inc., San Jose, CA (US)

( * ) Notice: Subject to any disclaimer, the term of this patent is extended or adjusted under 35 U.S.C. 154(b) by 445 days.

(21) Appl. No.: 12/504,868

(22) Filed: Jul. 17, 2009

(65) Prior Publication Data

US 2011/0013267 A1    Jan. 20, 2011

(51) Int. Cl.
*H01S 3/00* (2006.01)

(52) U.S. Cl.
USPC ........................................................ 359/334

(58) Field of Classification Search
USPC ..................... 398/16, 32; 359/334
See application file for complete search history.

(56) References Cited

U.S. PATENT DOCUMENTS

| | | | |
|---|---|---|---|
| 5,903,385 A | 5/1999 | Sugaya et al. | |
| 6,091,539 A | 7/2000 | Kosaka | |
| 6,233,091 B1 | 5/2001 | Kosaka et al. | |
| 6,388,801 B1 | 5/2002 | Sugaya et al. | |
| 6,930,823 B2 * | 8/2005 | Nakamoto et al. | 359/334 |
| 6,961,522 B1 | 11/2005 | Castagnetti et al. | |
| 7,174,097 B2 * | 2/2007 | Alleston et al. | 398/16 |
| 2004/0052453 A1 * | 3/2004 | Mao et al. | 385/27 |

* cited by examiner

*Primary Examiner* — Mark Hellner
(74) *Attorney, Agent, or Firm* — Edell, Shapiro & Finnan, LLC

(57) ABSTRACT

Techniques, in the form of an apparatus, logic and a method, are provided to set power levels for multiple Raman pump wavelengths in a distributed Raman amplification configuration in order to achieve a target gain and tilt or desired gain profile. A Raman pump light source is activated at each of a plurality of pump wavelengths and at each of a plurality of pump power levels such that only one pump wavelength at a given pump power level is active at a time to thereby amplify an optical probe signal in the optical fiber to produce an amplified probe signal. The level of the amplified probe signal at each of the pump power levels for the plurality of pump wavelengths is measured. The pump power level for each of the plurality of pump wavelengths is computed based on the measured levels of the amplified probe signals due to each of the pump power levels and at each of the pump power levels for the plurality of pump wavelengths.

20 Claims, 6 Drawing Sheets

FIBER-ADAPTIVE DISTRIBUTED RAMAN AMPLIFIER PUMP SETUP SCHEME

TECHNICAL FIELD

The present disclosure relates to optical network equipment, and more particularly to configuring a power level of Raman pumps in an optical network.

BACKGROUND

Distributed Raman amplification is a technique useful to achieve amplification gain in an optical fiber by injecting strong light power, called a "pump", at a proper wavelength. It is common to employ multi-wavelength light pump sources in order to achieve broad spectrum light amplification suitable for dense wavelength division multiplexed (DWDM) applications. The light pump source needs to be set to a proper power level and unbalance, whether for light pump at a single wavelength or at each of multiple wavelengths in order to achieve a desired gain level, gain flatness and gain tilt. There are approaches heretofore known to set the power level of a Raman light pump source.

One approach is to evaluate the Raman pump power level and unbalance through trial and error. For example, a full DWDM "comb" is transmitted through an amplified optical fiber. The received spectrum is measured and the power level and unbalance are changed continuously until the desired gain, tilt and flatness have been achieved. This procedure may be performed manually by a human operator or automatically.

Another approach involves a complete characterization of an optical fiber span in terms of a Raman gain coefficient, spectral attenuation and longitudinal loss profile along the propagation direction. Data related to these parameters are supplied as input to a numerical model that simulates the Raman amplification process and thus is used to evaluate the proper power levels and unbalance. Values for the power levels and unbalance so determined are applied to the Raman light pump source and are subsequently finely tuned using a spectrally resolved measurement of a large DWDM comb transmitted through the optical fiber.

DESCRIPTION OF EXAMPLE EMBODIMENTS

Overview

Techniques, in the form of an apparatus, logic and a method, are provided to set power levels for multiple Raman pump wavelengths in a distributed Raman amplification configuration. A Raman pump light source is activated at each of a plurality of pump wavelengths and at each of a plurality of pump power levels such that only one pump wavelength at a given pump power level is active at a time to thereby amplify an optical probe signal in the optical fiber to produce an amplified probe signal. The level of the amplified probe signal at each of the pump power levels for the plurality of pump wavelengths is measured. The pump power level for each of the plurality of pump wavelengths is computed based on the measured levels of the amplified probe signals due to each of the pump power levels and at each of the pump power levels for the plurality of pump wavelengths. The optical probe signal may be supplied to a first end of the optical fiber and the Raman pump wavelengths are supplied to a second end of the optical fiber in order to amplify the optical probe signal by backward propagation amplification. The measurements of the levels of the amplified optical probe signal are made based on the amplified probe signal received at the second end of the optical fiber. These techniques allow for automatic configuration of a Raman distributed amplifier using simple probe signal(s) and power measurements by a wideband photodiodes. No spectral measurements are necessary.

Example Embodiments

Figure 1:
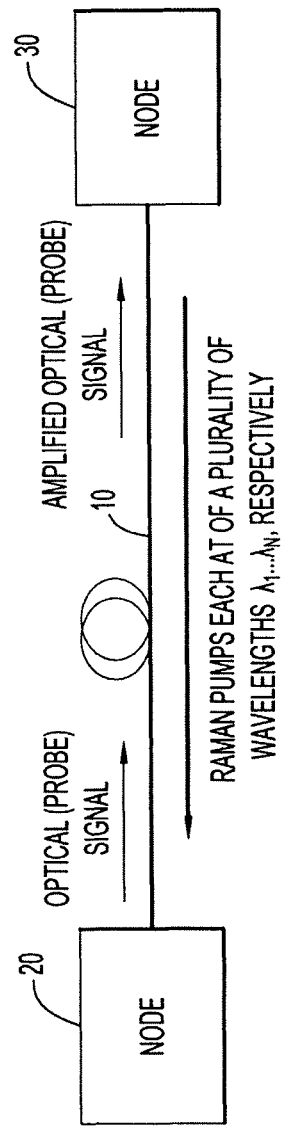
FIG. 1 is a diagram generally illustrating a scheme for determining power levels of Raman pump light at multiple wavelengths from measurements of an amplified optical probe signal on an optical fiber.
Figure 2:
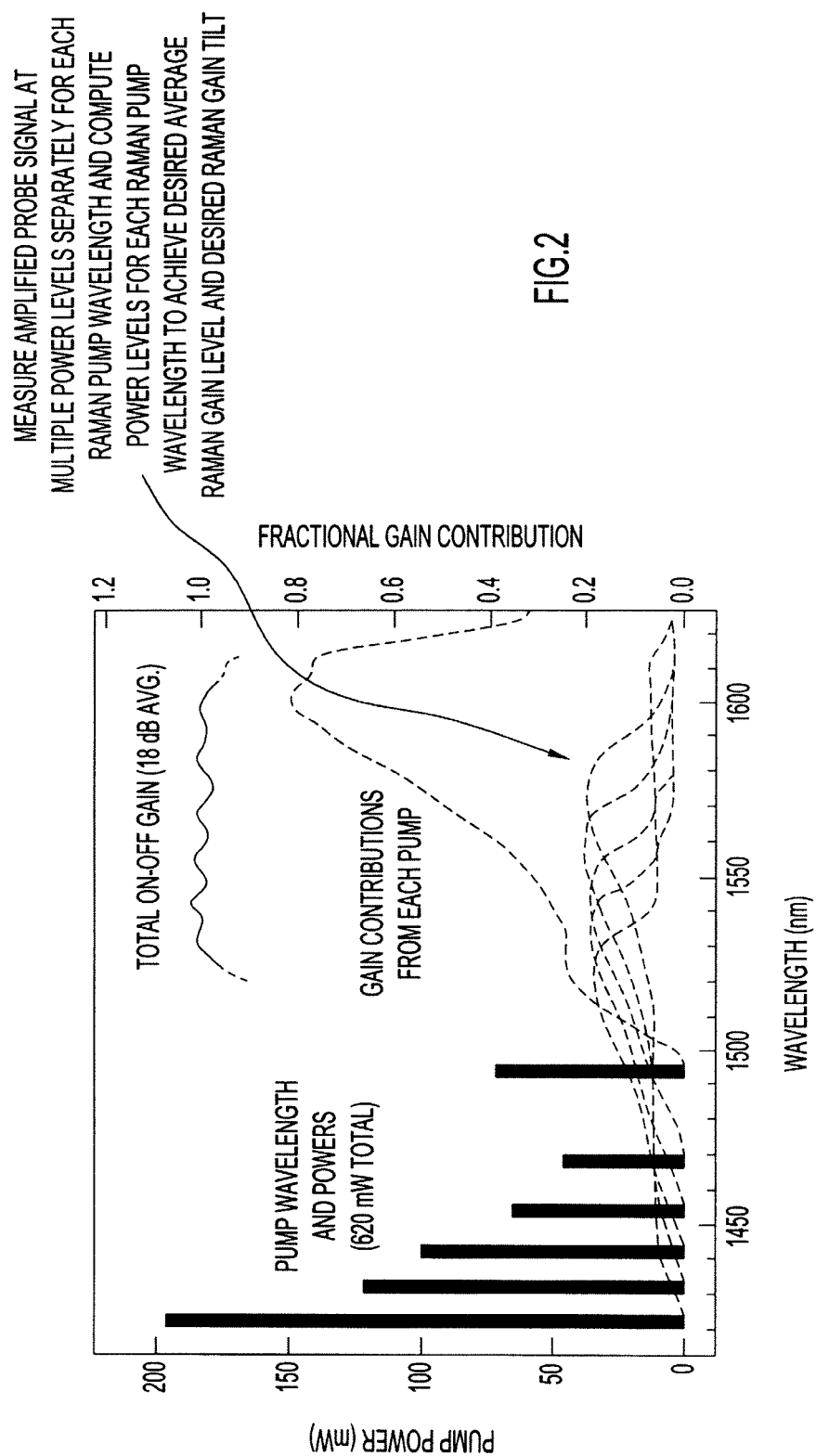
FIG. 2 is a plot illustrating an example of gain contributions in an optical fiber from Raman pumps at multiple wavelengths.

Referring first to FIGS. 1 and 2, a span or segment of an optical fiber is shown at 10. The optical fiber span 10 comprises a first end 12 and a second end 14. When deployed in an optical communications network, there are nodes connected to the first and second ends 12 and 14, respectively. In the example shown in FIG. 1, there is a node 20 connected to the first end 12 of the optical fiber span 10 and a node 30 connected to the second end 14 of the optical fiber span 10.

An optical signal may be transmitted from node 20 to node 30. To do so, there is a Raman light pump source at node 30 that is configured to generate Raman pump light at wavelengths $\lambda_1$-$\lambda_N$, respectively. The Raman pump light at wavelengths $\lambda_1$-$\lambda_N$ serve to achieve backward Raman amplification of the optical signal sent from node 20.

FIG. 2 illustrates plots associated with operation of a multi-wavelength Raman pump source that may be employed at node 30 in the configuration shown in FIG. 1. FIG. 2 shows that there is a gain contribution from each of Raman pump light wavelength at different wavelengths.

Techniques are provided herein for determining the individual power levels of each Raman pump light (at its corresponding wavelength) in the Raman multi-wavelength pumping scheme depicted in FIGS. 1 and 2. The individual power levels of the Raman pump light wavelengths are determined in order to achieve a desired average Raman gain level and a desired Raman gain tilt in the optical fiber span. Accordingly, as indicated in FIGS. 1 and 2, the optical signal that originates at node 20 is used to serve as an optical probe signal that is amplified by the Raman pump light wavelengths at multiple power levels of the Raman pump light wavelengths. The resulting amplified probe signal is detected at node 30 and is measured at the multiple power levels separately for each Raman pump light wavelength. From the measured level of the amplified probe signal under these conditions, power levels for each Raman pump light wavelength is computed to achieve desired average Raman gain and Raman gain tilt.

The gain versus pump power level relationship depends on several factors. The type of optical fiber used affects the gain as different optical fibers have different Raman response characteristics. The attenuation characteristics of the optical fiber also impact this relationship, and may vary with wavelength (light pump and optical signal) as well as manufacturing techniques for the optical fiber. Moreover, the presence of unknown lumped losses along the fiber, such as fiber splices and connectors, have an impact on the Raman gain.

Simulations with different fiber attenuation profiles have shown that if the Raman pump saturation (which depends on both Raman pump power and total signal power) is negligible, then the average gain and gain ripple roughly depend only on $(G_1, G_2, \ldots G_N)$ only where $G_x$ is the on-off gain at some wavelength channel s due to Raman pump light at wavelength $\lambda_x$, that is, with only one of the N multiple wavelength lasers of a multi-wavelength Raman pump light source turned on at a time.

The expression for the on-off gain at channel s associated with the optical probe signal gain due to Raman pump light wavelength $\lambda_x$ is:

$$G_{\lambda x} = \exp\left(g_R(\upsilon_{P,\lambda x}, \upsilon_s) \cdot \frac{L_{eff,\lambda x} P_{\lambda x}}{A_{eff}}\right), \quad (1)$$

where $g_R(\upsilon_{P,\lambda x}, \upsilon_s)$ is the Raman gain coefficient of the optical fiber for the pump at optical frequency $\upsilon_{P,\lambda x}$ and optical signal frequency $\upsilon_s$, $L_{eff}$ is the effective length of the optical fiber, $A_{eff}$ is the effective attenuation of the optical fiber, and $P_{\lambda x}$ is the power at Raman pump wavelength $\lambda x$.

The fiber Raman characteristics are all summarized by $G_{\lambda 1}(P_{\lambda 1}), G_{\lambda 2}(P_{\lambda 2}), \ldots, G_{\lambda N}(P_{\lambda N})$ for pump wavelengths $\lambda_1 - \lambda_N$, or equivalently by a gain efficiency $k_{\lambda x}$, where:

$$k_{\lambda x} = g_R(\upsilon_{P,\lambda x}, \upsilon_s) \cdot \frac{L_{eff,\lambda x}}{A_{eff}}. \quad (2)$$

Figure 3:
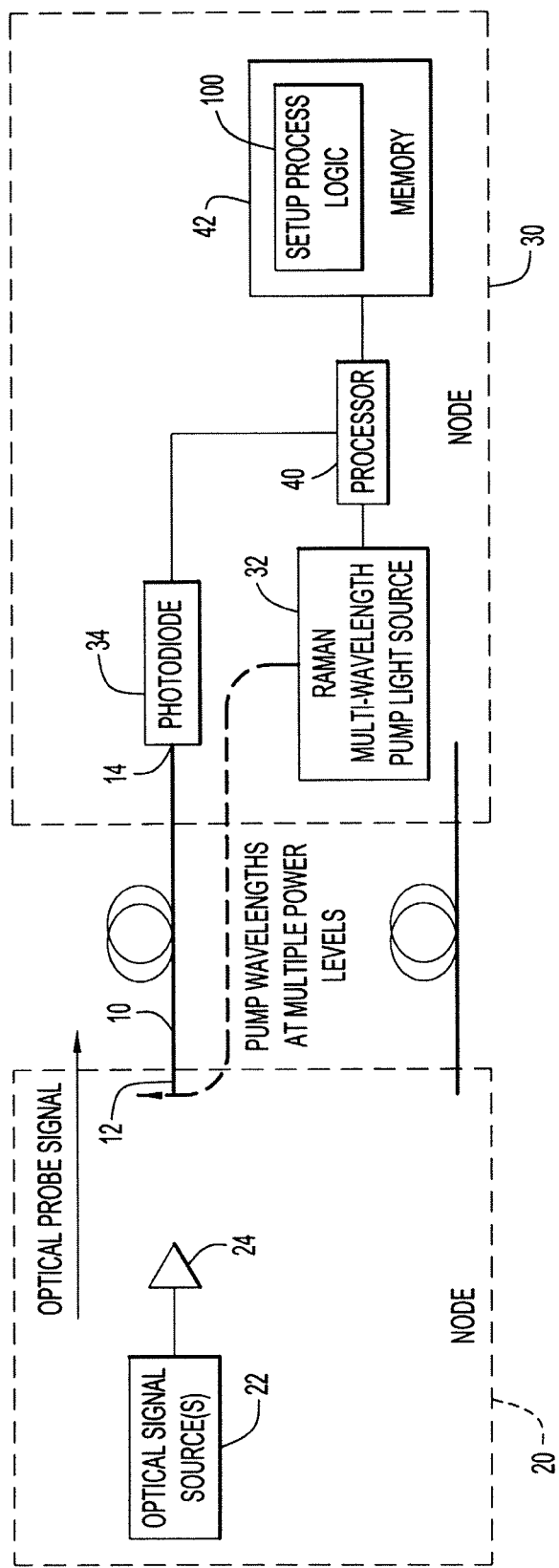
FIG. 3 is a block diagram of a distributed optical amplifier setup scheme where one node connected to an optical fiber is configured to perform setup process logic for determining power levels of multiple Raman pump wavelengths used for amplifying optical signals on the optical fiber.

Turning now to FIG. 3, a configuration is shown for a distributed Raman amplifier setup. In this configuration, node 20 comprises one or more signal sources 22 and an optical amplifier 24. The optical amplifier 24 may be an Erbium-doped fiber amplifier (EDFA). The node 20 may be a terminal node and the signal sources 22 may be optical transponders at the terminal node that are used to transmit optical signals. In the context of the distributed Raman amplifier setup scheme described herein, one or more optical signals generated by the signal sources 22 is used as an optical probe signal for transmission over the optical fiber span 10 to node 30. The signal sources 22 may be so-called channel lasers.

Figure 4:
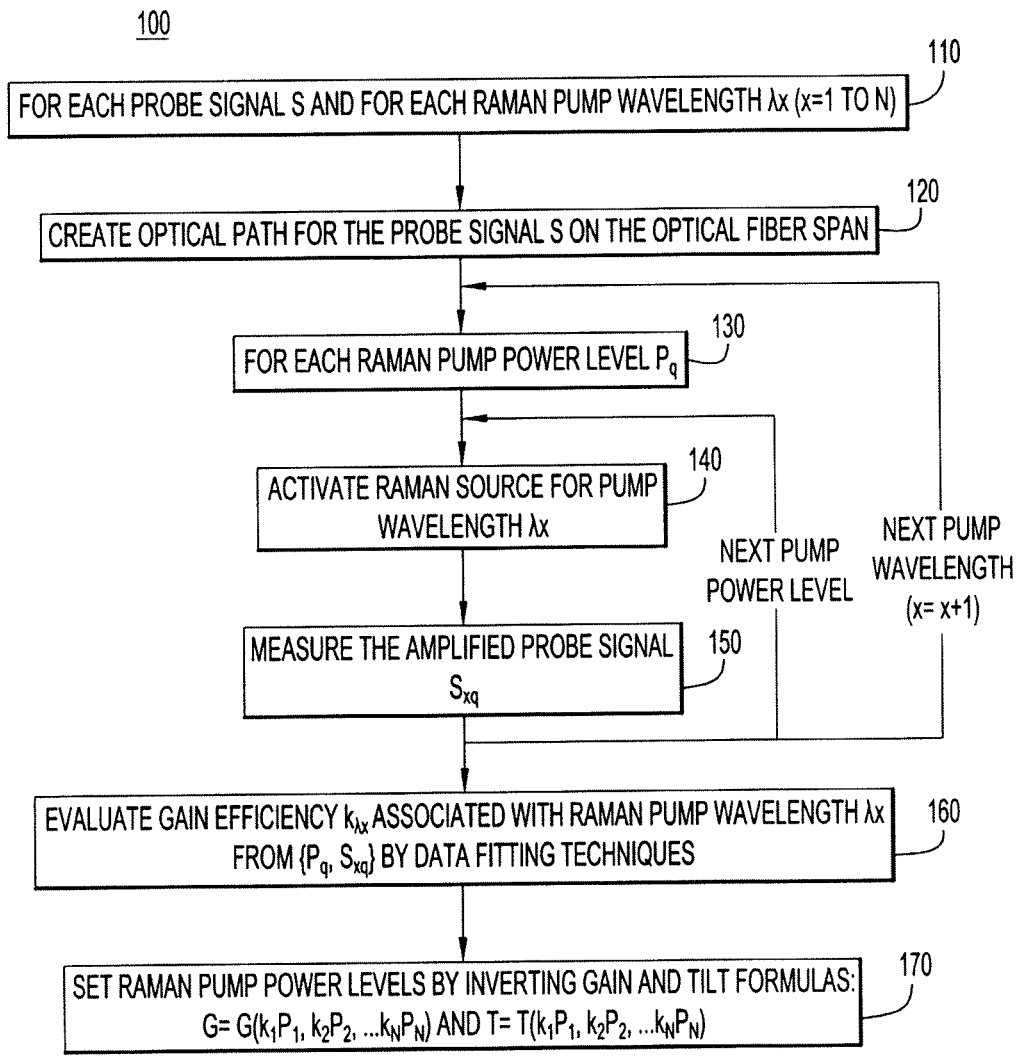
FIG. 4 is an example of a flow chart for the setup process logic.

Node 30 comprises a multi-wavelength Raman pump light source 32 and a photodiode 34, or in general, any photodetector device capable of measuring a level of an optical signal. The photodiode 34 is a wideband photodiode in that it can measure a level of the optical signal across a wide range of wavelengths but it is also configured to reject the Raman back-scattered signal, such as by using an optical filter. Several separate and individual Raman pump lasers, each at different wavelengths, may be employed which is functionally the same as a single multi-wavelength Raman pump light source. Node 30 may be a local node in an optical network and to this end comprises the elements 32 and 34 as part of its standard configuration. In addition, the node 30 comprises a processor 40 that is configured to perform a variety of control functions for the node 30. For example, the processor 40 is a microprocessor or microcontroller that executes instructions stored in a memory 42. That is, the memory may contain instructions for setup process logic 100 such that when the processor 40 executes the instructions for the setup process logic 100, the processor 40 performs a setup procedure that selects the power levels of each of the Raman pump light wavelengths generated by the multi-wavelength Raman pump light source 32. A flow chart for the setup process logic 100 is shown in FIG. 4 and described hereinafter. The processor 40 and memory 42 may also be part of a standard configuration for the node 30, and thus the node 40 may be specifically configured to perform the setup procedure by writing instructions, i.e., storing a software program, into the memory 42, to enable the processor to perform the process logic 100.

The process logic 100 is designed to perform an automatic installation procedure that is based on separately measuring the individual contributions of the overall Raman gain, such as those contributions shown in the plots of FIG. 2. Briefly, Raman pump light at one wavelength is coupled from the Raman pump light source 32 to the optical fiber span 10 while the optical probe signal is sent from node 20. The photodiode 34 measures the level of the optical probe signal that is amplified as a result of backward Raman amplification caused by the Raman pump light at a given wavelength, with one Raman pump light wavelength activated at a time. The processor 40 captures these measurements made by the photodiode 34 at multiple power levels for each Raman pump light wavelength (one Raman pump wavelength at a time), and uses these measurements to compute proper power levels for each Raman pump light wavelength to be used on the optical fiber span 10 between nodes 20 and 30. This measurement allows for determination of the dependence of the on-off gain variation from the pump power variation for each pump wavelength. The minimum and maximum power values for which the pump emission wavelength is stable may be used as the pump power levels during the setup procedure, but more that two values within this range may be chosen leading to greater accuracy. The procedure is repeated for each individual pump wavelength. After having repeated the procedure for each pump wavelength, the individual pump power levels for each wavelength (i.e. Raman pump power and imbalance) to match a given gain level gain ripple and gain tilt are obtained from a polynomial evaluation instead of full spectrum simulation.

Turning now to FIG. 4, the process logic 100 is described in greater detail. Reference is also made to FIG. 3 for purposes of the description of FIG. 4. As indicated at 110, for each probe signal S (at a given wavelength) and for each Raman pump laser wavelength $\lambda_x$, x=1 to N, a set of functions 120-160 are performed. At 120, an optical path is created for the optical probe signal S on the optical fiber span. This involves setting any amplifiers on the optical path, such as the amplifier 24, and any other devices, such as re-configurable optical add-drop multiplexers (ROADMs), etc., in the optical path of the optical fiber span 10. To this end, the processor 40 in node 30 may communicate with control elements associated with these optical elements in order to configure them to create the optical path.

A first loop is created to perform functions 130-150 for each of a plurality of pump wavelengths $\lambda_1 - \lambda_N$ such that x is incremented over 1 to N in this loop.

In addition, at 130, a second loop is created to perform functions 140 and 150 for each of multiple pump power levels, where a pump power level is designated as $P_q$. Specifically, at 140, the multi-wavelength Raman pump light source 32 is turned on for a given wavelength $\lambda_x$ at a given power level, thereby injecting Raman pump light at wavelength $\lambda_x$ into the optical fiber span 10 from node 30 backward towards node 20. The pump light at wavelength $\lambda_x$ causes backward propagation amplification of the optical probe signal S. At 150, the optical probe signal S is detected by the photodiode 34 where a measurement of the level of the amplified probe signal associated with pump light wavelength $\lambda_x$ at a pump light power level $P_q$ is determined. The amplified probe signal detected and measured by the photodiode 34 is denoted $S_{xq}$. The levels of amplified probe signal measured by the photodiode 34 are used to evaluate a differential measure of the gain efficiency $k_{\lambda x}$ at the specific wavelength of the optical probe signal due to a specific Raman pump light wavelength and pump power level and the on-off gain is then estimated using the measured levels. The Raman pump source 32 is activated for a wavelength and is kept on long enough to enable a measurement of the amplified optical probe signal, and then it is turned off.

As indicated in FIG. 4, after function 150 is performed for a pump light wavelength $\lambda_x$ at a pump power level, function 140 is repeated for the next pump power level at the same pump light wavelength. Thus, functions 140 and 150 are repeated for each of a plurality of pump power levels for a given pump light wavelength until all pump power levels have been used. In general, the functions 140 and 150 are performed for at least two pump power levels, however, the more pump power levels for which measurements are made, the greater accuracy that can be achieved for setting the pump power levels. In the case that two pump power levels are used for each pump light wavelength in this setup procedure, the two pump power levels may comprise a relatively "low" pump power level and relatively "high" pump power level. Turning on the pump light at different levels serves to partially cancel out any error induced by Raman-generated amplified spontaneous emission (ASE).

After functions 140 and 150 are performed for each power level for a given Raman pump light wavelength $\lambda_x$, then the next Raman pump light wavelength is selected and the loop of functions 140 and 150 is repeated to measure the amplified optical signal associated with another Raman pump light wavelength $\lambda_x$ at each of multiple pump power levels.

The functions 120-150 are thus performed to produce a measurement of the level of the amplified optical probe signal for multiple pump power levels for each of a plurality of Raman pump light wavelengths. In addition, as indicated in FIG. 4, the functions 120-150 may be performed for multiple optical probe signals, each at a different wavelength. When multiple optical probe signals are used, each at a different wavelength, the measurement function 150 is performed for each of the plurality of optical probe signals at the different wavelengths. Moreover, the number of optical probe signals (each at different wavelengths—a so-called "probe channel") need not be the same as the number of Raman pump light wavelengths. Again, the process logic 100 may be performed using a single optical probe signal (at a single given wavelength).

At 160, the gain efficiency parameter $k_{\lambda x}$ from equation (2) above is evaluated using values for the measured levels of the amplified optical probe signal(s) and values for the multiple pump power levels for each of the plurality Raman pump light wavelengths, denoted $\{P_q, S_{xq}\}$. Computation of the gain efficiency parameter $k_{\lambda x}$ may be performed using data fitting techniques, such as linear regression, from the measured levels (and derived Raman gain) of the amplified optical probe signal(s) across the multiple pump power levels for each of the plurality Raman pump light wavelengths.

An example of a linear regression technique is the computation:

$$k_{\lambda x} = \frac{n \sum_{q=1}^{n} s_{xq} P_q - \sum_{q=1}^{n} s_{xq} \sum_{q=1}^{n} P_q}{n \sum_{q=1}^{n} S_{xq}^2 - \left(\sum_{q=1}^{b} S_{xq}\right)^2},$$

where $S_{xq}$ is the measurement made by the photodiode at pump wavelength x and $P_q$ is the pump power.

At 170, the Raman pump power levels for each Raman pump light wavelength are computed by inverting Gain and Tilt formulas $G=G(k_1P_1, k_2P_2, \ldots k_NP_N)$ and $T=T(k_1P_1, k_2P_2, \ldots k_NP_N)$, for N Raman pump light wavelengths, where $P_1$-$P_N$ are a set of possible pump power levels for the N Raman pump wavelengths. The Gain and Tilt formulas $G=G(k_1P_1, k_2P_2, \ldots k_NP_N)$ and $T=T(k_1P_1, k_2P_2, \ldots k_NP_N)$ have been obtained by means of data fitting techniques applied to data obtained from simulations or from an extensive set of measurements of the type described herein. Given data for target gain $G_{tgt}$ and tilt $T_{tgt}$, one can evaluate $k_1P_1, k_2P_2 \ldots k_NP_N$ such that they satisfy $G_{tgt}=G(k_1P_1, k_2P_2, \ldots k_NP_N)$ and $T_{tgt}=T(k_1P_1, k_2P_2, \ldots k_NP_N)$. This can be performed using either analytical or numerical approaches using well-known techniques. Thereafter, $P_1, P_2, \ldots P_N$ are evaluated using $k_1, k_2, \ldots k_N$ from the computation described above (e.g., the linear regression computation) by means of a simple division.

When multiple optical probe signals, each at a different wavelength, are employed, the computing function 170 involves computing the pump power level for each of the plurality of pump wavelengths based on measured levels of each of the plurality of amplified optical probe signals at the different wavelengths due to each of the pump power levels at the plurality of pump wavelengths.

As described hereinafter in conjunction with FIG. 6, the process logic 100 may be performed with respect to each of a plurality of optical fiber spans served by a corresponding plurality of Raman pump light wavelengths in order to set pump power levels for the plurality of Raman pump light wavelengths for each optical fiber span.

When two Raman pump light wavelengths are used, inverting the Gain and Tilt formulas are easily computed. The inversion computation may become more complex for more than two Raman pump light wavelengths. In those circumstances, additional (technology and safety) constraints may be imposed to simplify the inversion computations.

In another form, the Gain and Tilt formulas may be employed to fill a look-up table. Data in the table may then be analyzed to determine and retrieve the power level for a given combination of Gain and Tilt. For example, using the formulas $G=G(k_1P_1, k_2P_2, \ldots k_NP_N)$ and $T=T(k_1P_1, k_2P_2, \ldots k_NP_N)$, a table can be populated to set a correspondence between the couple (G,T) and the n-uple $(k_1P_1, k_2P_2, \ldots k_NP_N)$. $k_i$ and $P_i$ are not used to populate the table, but after having obtained the products $k_iP_i$ from the look-up table, the power levels $P_i$ are obtained by a simple division by gain efficiency $k_i$. That is, the look-up table provides a correspondence between couples of gain and tilt values and combinations of pump levels and gain efficiencies.

Figure 5:
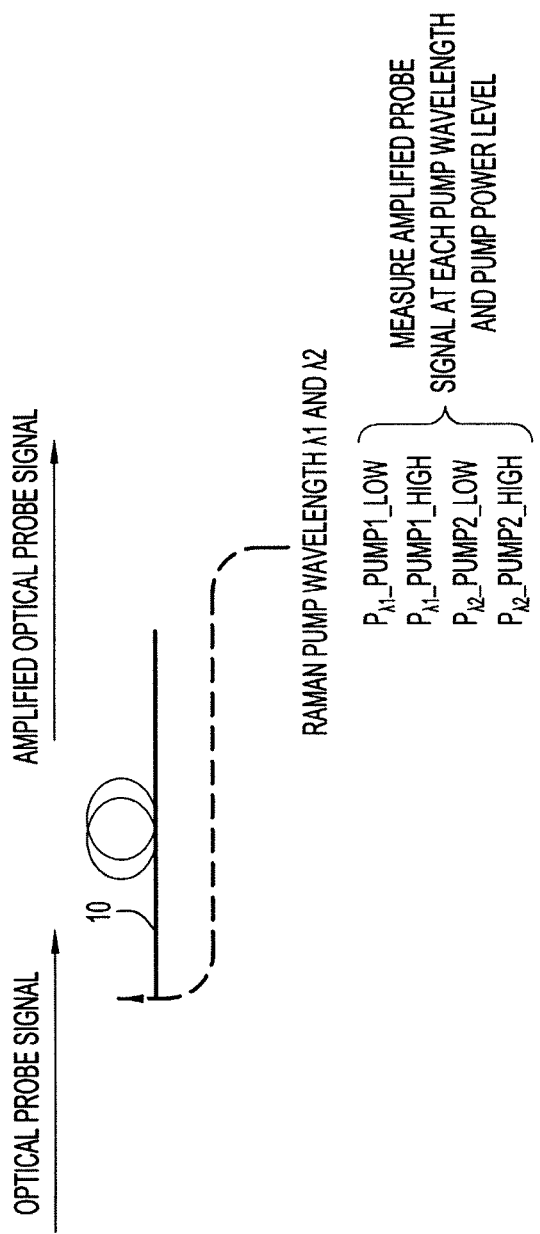
FIG. 5 is a diagram illustrating an example of the setup process to determine pump power levels of two optical amplifier pumps.

Reference is now made to FIG. 5 for an example of the process logic 100 where two Raman pump light wavelengths $\lambda_1$ and $\lambda_2$ are used. In this example, each Raman pump light wavelength is turned on to a low power level and to a high power level. For example, first the Raman pump light wavelength $P_{\lambda 1}$ is turned on at a relatively low power level ($P_{\lambda 1\_}$Pump1_Low) and the resulting amplified optical probe signal is measured. The Raman pump light wavelength $P_{\lambda 1}$ is then turned on a relatively high power level ($P_{\lambda 1}$_Pump1_High) and the resulting amplified probe signal is measured. Next, the Raman pump light wavelength $P_{\lambda 2}$ is turned on at a relatively low power level ($P_{\lambda 2}$_Pump1_Low) and the resulting amplified optical probe signal is measured. Finally, the Raman pump light wavelength $P_{\lambda 2}$ is turned on at a relatively high power level ($P_{\lambda 2}$_Pump1_High) and the resulting amplified optical probe signal is measured. Using the measured levels of the optical amplified probe signal under each of these scenarios, optimal targets for the pump power levels for Raman pump light wavelengths $\lambda_1$ and $\lambda_2$ are determined according to the computations described above in connection with functions 160 and 170 in FIG. 4. The multi-wavelength Raman pump light source is then configured to operate at those pump power levels.

Figure 6:
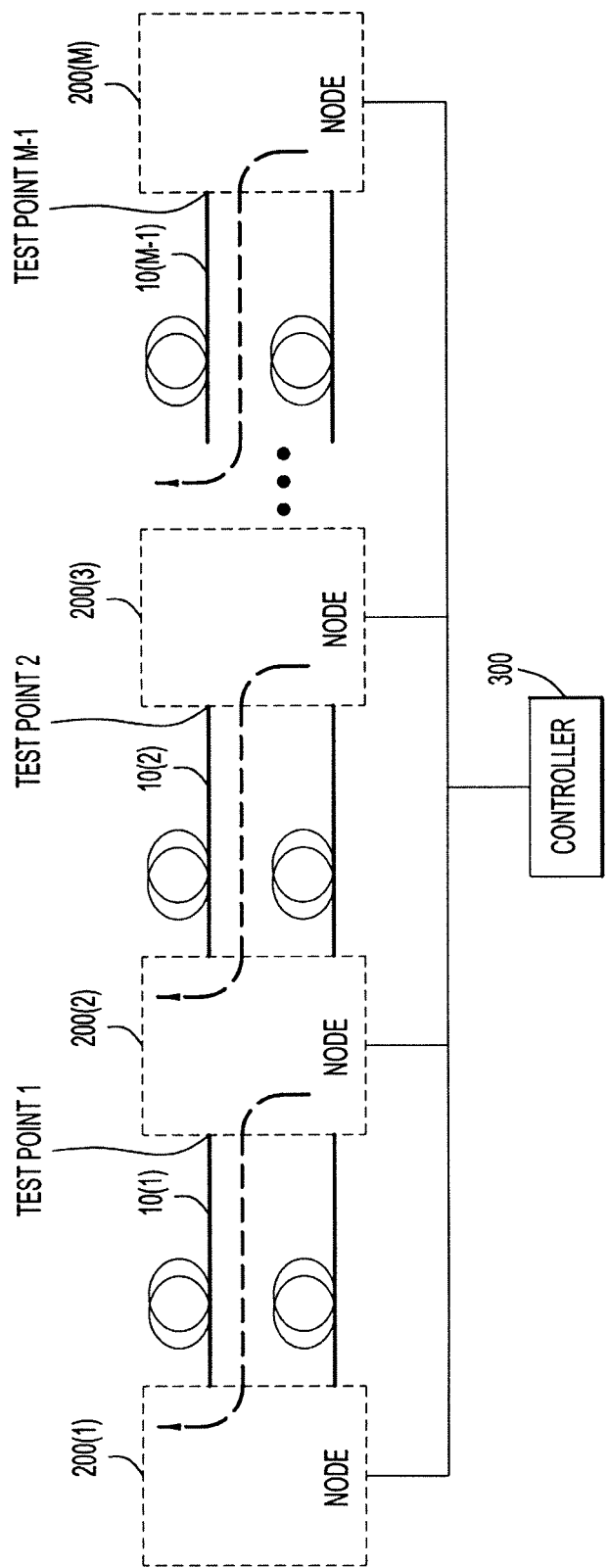
FIG. 6 is a block diagram illustrating multiple optical fiber spans for which the setup process is performed.

Referring now to FIG. 6, a diagram is shown comprising a plurality of nodes 200(1)-200(M) connected by respective ones of a plurality of optical fiber spans 10(1)-10(M−1). Test points exist at contiguous nodes where a calibration/setup procedure such as the one described above, is performed for the multiple optical fiber spans 10(1)-10(M−1) in a single session. For example, there is first test point, Test Point 1, at node 200(2), a second test point, Test Point 2, at node 200(3), and so on. A controller 300 is provided that communicates with each of the nodes 200(1)-200(M). The controller 300 is configured to coordinate control of the optical amplifiers and Raman pumps in the nodes 200(1)-200(M), to synchronize the optical power level measurements made at the different test points in order to compute the Raman pump power levels at each of nodes 200(2)-200(M) and to control and synchronize the optical probe signal sources.

The setup techniques described herein have numerous advantages. First, they can be used for any type of optical fiber, regardless of the Raman gain efficiency and of the position of splices along the fiber. There is no need to obtain detailed measurements of attenuation (length-resolved) and Raman gain efficiency, which greatly simplifies the deployment phase. Second, the technique may be implemented for automatic execution in a Raman pump light unit within a node, thereby making the Raman pump light unit a self-configuring device. Third, these techniques are rather simple to implement because they do not require spectral measurements. A wideband photodiode used in a node to measure the amplified optical probe signal is sufficient. This avoids cumbersome measurements and simplifies the system deployment.

Although the apparatus, logic, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, logic, and method, as set forth in the following claims.

What is claimed is:

1. A method comprising:

activating a Raman pump light source at each of a plurality of pump wavelengths, and at each of the plurality of wavelengths activating the Raman pump light source at a plurality of pump power levels such that only one pump wavelength at a given pump power level is active at a time to thereby amplify an optical probe signal in an optical fiber to produce an amplified probe signal;

measuring a level of the amplified probe signal at each of the pump power levels for the plurality of pump wavelengths; and computing a pump power level for each of the plurality of pump wavelengths based on the measured levels of the amplified probe signals due to each of the pump power levels and at each of the pump power levels for the plurality of pump wavelengths.

2. The method of claim 1, and further comprising supplying the optical probe signal to a first end of the optical fiber, coupling the Raman pump light source to a second end of the optical fiber in order to amplify the optical probe signal by backward propagation amplification, and wherein measuring is performed based on the amplified probe signal received at the second end of the optical fiber.

3. The method of claim 1, wherein computing comprises evaluating a gain efficiency parameter $k_{\lambda x}$ from values for the measured level of the amplified probe signal associated with pump wavelength $\lambda x$ at each of the plurality of power levels and values for the plurality of power levels, where the gain efficiency $$k_{\lambda x} = g_R(\upsilon_{P,\lambda x}, \upsilon_s) \cdot \frac{L_{eff,\lambda x}}{A_{eff}},$$

and the on-off gain is $$G_{\lambda x} = \exp\left(g_R(\upsilon_{P,\lambda x}, \upsilon_s) \cdot \frac{L_{eff,\lambda x} P_{\lambda x}}{A_{eff}}\right),$$

where $g_R(\upsilon_{P,\lambda x},\upsilon_s)$ is the Raman gain coefficient of the optical fiber for the pump at optical frequency $\upsilon_{P,\lambda x}$ and optical signal frequency $\upsilon_s$, $L_{eff}$ is the effective length of the optical fiber, $A_{eff}$ is the effective attenuation of the optical fiber, and $P_{\lambda x}$ is the power at Raman pump wavelength $\lambda x$.

4. The method of claim 3, wherein computing comprises inverting formulas for gain and gain tilt based on the values computed for the gain efficiency $k_{\lambda x}$ at each of a plurality of pump wavelengths and the values for the plurality of power levels.

5. The method of claim 4, wherein computing comprises computing the pump power level for each of the plurality of pump wavelengths with respect to target gain and tilt data.

6. The method of claim 4, wherein computing comprises retrieving values for the pump power level for each of the plurality of pump wavelengths from a look-up table that provides a correspondence between couples of gain and tilt values and combinations of pump power levels and gain efficiencies.

7. The method of claim 1, wherein measuring is performed for each of a plurality of optical probe signals at different wavelengths, and wherein computing comprises computing the pump power level for each of the plurality of pump wavelengths based on measured levels of each of the plurality of amplified optical probe signals at the different wavelengths due to each of the pump power levels at the plurality of pump wavelengths.

8. The method of claim 1, wherein activating, and measuring and computing are performed with respect to each of a plurality of optical fiber spans served by a corresponding plurality of pump wavelengths in order to set pump power levels for the plurality of pump wavelengths for each optical fiber span.

9. An apparatus comprising:
a photodetector configured to couple to an optical fiber;
a source of a plurality of pump light wavelengths, wherein the source is configured to couple pump light at the plurality of pump wavelengths to an optical fiber in order to amplify an optical probe signal supplied to the optical fiber thereby producing an amplified probe signal in the optical fiber by backward propagation amplification;
a processor configured to connect to the photodetector and to the plurality of optical amplifying pumps, wherein the processor is configured to:
activate the source at each of the plurality of pump wavelengths, and at each of the plurality of wavelengths activate the Raman pump light source at a plurality of pump power levels such that only one pump wavelength at a given pump power level is active at a time;
obtain from the photodetector a measure a level of the amplified probe signal at each of the pump power levels for the plurality of pump wavelengths; and
compute a pump power level for each of the plurality of pump wavelengths based on the measured levels of the amplified probe signals at each of the pump power levels and at each of the pump power levels for the plurality of pump wavelengths.

10. The apparatus of claim 9, wherein the processor is configured to evaluate a gain efficiency parameter $k_{\lambda x}$ from values for the measured level of the amplified probe signal associated with pump wavelength $\lambda x$ at each of the plurality of power levels and values for the plurality of power levels, where the gain efficiency $$k_{\lambda x} = g_R(\upsilon_{P,\lambda x}, \upsilon_s) \cdot \frac{L_{\mathit{eff},\lambda x}}{A_{\mathit{eff}}}$$

and the on-off gain is $$G_{\lambda x} = \exp\left(g_R(\upsilon_{P,\lambda x}, \upsilon_s) \cdot \frac{L_{\mathit{eff},\lambda x} P_{\lambda x}}{A_{\mathit{eff}}}\right),$$

where $g_R(\upsilon_{P,\lambda x}, \upsilon_s)$ is the Raman gain coefficient of the optical fiber for the pump at optical frequency $\upsilon_{P,\lambda x}$ and optical signal frequency $\upsilon_s$, $L_{\mathit{eff}}$ is the effective length of the optical fiber, $A_{\mathit{eff}}$ is the effective attenuation of the optical fiber, and $P_{\lambda x}$ is the power at Raman pump wavelength $\lambda x$.

11. The apparatus of claim 10, wherein the processor is configured to compute values for the power levels of the plurality of pump wavelengths by inverting formulas for gain and gain tilt based on the values computed for the gain efficiency $k_{\lambda x}$ at each of a plurality of pump wavelengths and the values for the plurality of power levels.

12. The apparatus of claim 11, wherein the processor is configured to compute values for the power levels of the plurality of pump wavelengths with respect to target gain and tilt data.

13. The apparatus of claim 11, wherein the processor is configured to retrieve values for the pump power level for each of the plurality of pump wavelengths from a look-up table that provides a correspondence between couples of gain and tilt values and combinations of pump power levels and gain efficiencies.

14. The apparatus of claim 9, wherein the processor is configured to activate the source at each of the plurality of pump wavelengths and at each of the plurality of pump power levels with respect to a plurality of optical probe signals each at a different wavelength, and to obtain a measure of the level of the amplified optical probe signal at each of the different wavelengths, and to compute the pump power level for each of the plurality of pump wavelengths based on measured levels of each of the plurality of amplified optical probe signals at different wavelengths due to at each of the pump power levels at the plurality of pump wavelengths.

15. Logic encoded in one or more tangible media for execution and when executed operable to:
activate a Raman pump light source at each of a plurality of pump wavelengths, and at each of the plurality of wavelengths activate the Raman pump light source at a plurality of pump power levels such that only one pump wavelength at a given pump power level is active at a time to thereby amplify the optical probe signal in an optical fiber to produce an amplified probe signal by backward propagation amplification;
measure a level of the amplified probe signal at each of the pump power levels for the plurality of pump wavelengths; and
compute a pump power level for each of the plurality of pump wavelengths based on the measured levels of the amplified probe signals due to each of the pump power levels at each of the pump power levels for the plurality of pump wavelengths.

16. The logic of claim 15, wherein the logic that computes is configured to evaluate values for a gain efficiency parameter $k_{\lambda x}$ from values for the measured level of the amplified probe signal associated with pump wavelength $\lambda x$ at each of the plurality of power levels and values for the plurality of power levels, where the gain efficiency $$k_{\lambda x} = g_R(\upsilon_{P,\lambda x}, \upsilon_s) \cdot \frac{L_{\mathit{eff},\lambda x}}{A_{\mathit{eff}}}$$

and the on-off gain is $$G_{\lambda x} = \exp\left(g_R(\upsilon_{P,\lambda x}, \upsilon_s) \cdot \frac{L_{\mathit{eff},\lambda x} P_{\lambda x}}{A_{\mathit{eff}}}\right),$$

where $g_R(\upsilon_{P,\lambda x}, \upsilon_s)$ is the Raman gain coefficient of the optical fiber for the pump at optical frequency $\upsilon_{P,\lambda x}$ and optical signal frequency $\upsilon_s$, $L_{\mathit{eff}}$ is the effective length of the optical fiber, $A_{\mathit{eff}}$ is the effective attenuation of the optical fiber, and $P_{\lambda x}$ is the power at Raman pump wavelength $\lambda x$.

17. The logic of claim 16, wherein the logic that computes is configured to compute the pump power level for each of the plurality of pump wavelengths by inverting formulas for gain and gain tilt based on the values computed for the gain efficiency $k_{\lambda x}$ at each of a plurality of pump wavelengths and the values for the plurality of power levels.

18. The logic of claim 17, wherein the logic that computes comprises logic that is configured to compute the pump power level for each of the plurality of pump wavelengths with respect to target gain and tilt data.

19. The logic of claim 17, wherein the logic that computes comprises logic that is configured to retrieve values for the pump power level for each of the plurality of pump wavelengths from a look-up table that provides a correspondence between couples of gain and tilt values and combinations of pump power levels and gain efficiencies.

20. The logic of claim 15, wherein said logic that measures comprises logic configured to measure a level of each of a plurality of optical probe signals at different wavelengths, and wherein the logic that computes comprises logic configured to compute the pump power level for each of the plurality of pump wavelengths based on measured levels of each of the plurality of amplified optical probe signals at the different wavelengths due to each of the pump power levels at the plurality of pump wavelengths.

* * * * *